United States Patent [19]

Easley

[11] 4,445,291

[45] May 1, 1984

[54] LICENSE PLATE FRAME WITH DETACHABLE DISPLAY PANELS

[76] Inventor: Robert E. Easley, 5704 Woodland, Kansas City, Mo. 64110

[21] Appl. No.: 460,155

[22] Filed: Jan. 24, 1983

[51] Int. Cl.³ .............................................. G09F 7/00
[52] U.S. Cl. .................................................... 40/210
[58] Field of Search ................ 40/210, 588, 617, 574; 224/277, 42.03 R, 319; 229/16 A, 41 B

[56] References Cited

U.S. PATENT DOCUMENTS

| | | | |
|---|---|---|---|
| 1,524,847 | 2/1925 | Thorn | 40/210 |
| 1,575,950 | 3/1926 | Thorn | 40/210 |
| 2,093,620 | 9/1937 | Roessler | 40/210 |
| 2,135,191 | 11/1938 | McBrady | 40/210 |
| 2,711,851 | 6/1955 | Rabby | 229/41 B |
| 3,908,296 | 9/1975 | Harrison | 40/210 |

Primary Examiner—Robert Peshock
Assistant Examiner—Cary E. Stone
Attorney, Agent, or Firm—Schmidt, Johnson, Hovey & Williams

[57] ABSTRACT

A frame for a license plate is provided that includes a plurality of detachable display panels. The frame includes an upper and lower member interconnected by a pair of spaced apart side members. An elongated slot is formed in each of the members, and a display panel may be removably positioned in each slot by a pair of set screws.

2 Claims, 6 Drawing Figures

U.S. Patent  May 1, 1984  4,445,291
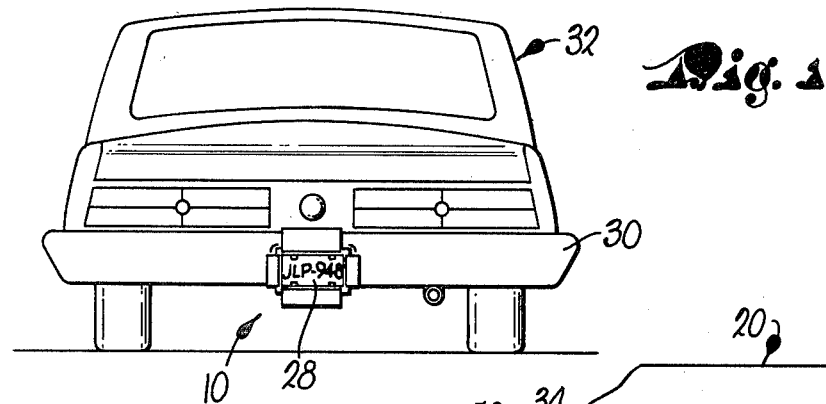
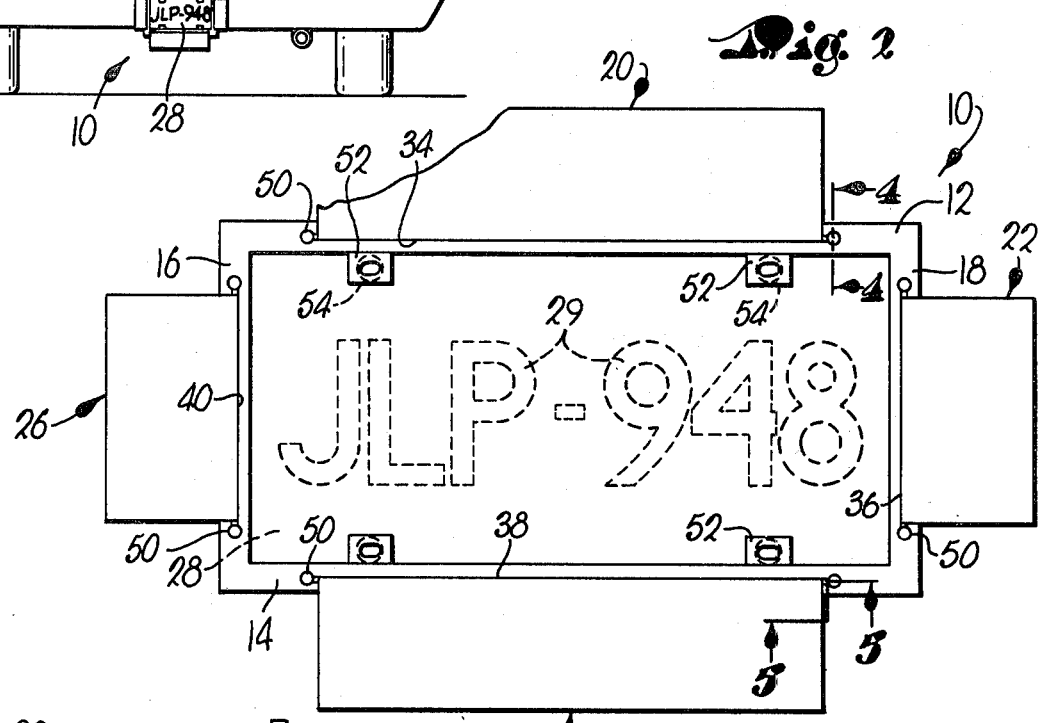
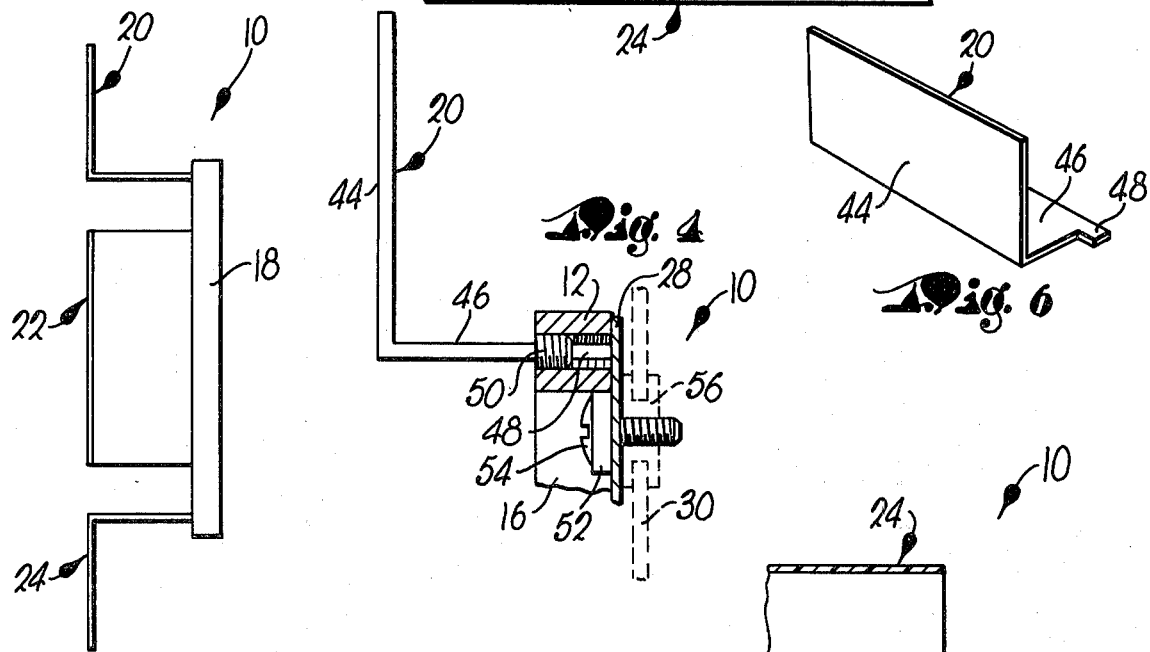

LICENSE PLATE FRAME WITH DETACHABLE DISPLAY PANELS

BACKGROUND OF THE INVENTION

1. Field of the Invention

This invention relates to a license plate frame of simple yet highly effective construction which includes the important feature of having detachable display panels. More particularly, it is concerned with a license plate holder that includes upper, lower and spaced apart side members each having elongated slots therein, and a display panel detachably positioned within each slot by a pair of removable set screws.

2. Description of the Prior Art

It is known in the art to provide frames for automobile license plates. Examples of such frames are disclosed in U.S. Pat. Nos. 1,524,847, 1,575,950, 2,093,620, 2,135,191 and 3,908,296. Furthermore, several of the license plate frames previously known have provided for display of various decals and other printed idicia on attachments to the license plate frame. None of the previously known attachments, however, have combined the features of secure positioning of the attachment to the license plate frame with ease of replacement of the attachment.

SUMMARY OF THE INVENTION

The problems outlined above are in large measure solved by the license plate frame with detachable display panels in accordance with the present invention. That is to say, the license plate frame hereof receives and securely positions a detachable display panel within the frame structure, yet provides for easy and rapid replacement of the display panel.

The license plate frame in accordance with the present invention broadly includes upper and lower members, and a pair of spaced apart side members interconnecting the upper and lower members. Each of the frame members includes an elongated slot therein within which a display panel is detachably received. The display panels are retained within the frame member slots by removable set screws.

BRIEF DESCRIPTION OF THE DRAWING

FIG. 1 is a rear elevational view of an automobile having a license plate frame in accordance with the present invention attached thereto;

FIG. 2 is a front elevational view depicting a license plate secured within a license frame in accordance with the present invention;

FIG. 3 is a side elevational view of a license plate frame in accordance with the present invention, depicting the detachable display panels projecting outwardly from the frame members;

FIG. 4 is a sectional view taken along the line 4—4 of FIG. 2;

FIG. 5 is a sectional view taken along the line 5—5 of FIG. 2; and

FIG. 6 is a perspective view of a detachable panel.

DETAILED DESCRIPTION OF THE PREFERRED EMBODIMENT

Referring now to the drawing, a license plate frame 10 in accordance with the present invention broadly includes an upper member 12, a lower member 14, a pair of spaced apart side members 16, 18 interconnecting the upper and lower members, and a plurality of display panels 20, 22, 24, 26. The frame 10 is depicted in the drawing in conjunction with a license plate 28, having alphanumeric characters 29 thereon, attached to the rear bumper 30 of an automobile 32. The frame members are preferably integrally molded and of cast metal, and the display panels are preferably of synthetic resin.

Each of the frame members 12, 14, 16, 18 includes an elongated slot 34, 36, 38, 40 therein. The opposed ends of each slot are enlarged to form set screw-receiving channels.

As best depicted in FIG. 6, the display panels include a display portion 44 and a retaining portion 46. The display portion 44 and retaining portion 46 are advantageously oriented at right angles such that the display portion 44 defines a plane generally parallel to the plane defined by the frame members, when the display panel is positioned within a frame member slot. A tab 48 extends outwardly from each side of the retaining portion 46.

As best depicted in FIG. 4, a set screw 50 is threadably received within each groove receiving channel. Set screw 50 abuts against the leading edge of tab 48, thereby securely positioning the display panels 20, 22, 24, 26 within their respective slots.

Metal flaps 52 extend inwardly of the frame 10 from the upper and lower frame members 12, 14. A screw 54 is received through each flap and through apertures in license plate 28, and is threadably secured within a plastic bracket 56 mounted on the bumper 30.

In operation, the license 28 is interposed between the bumper 30 of car 32 and the frame 10. Screws 54 are inserted through flaps 52 of frame 10 and through the apertures in the license plate 28, and are threadably received within synthetic resin brackets 54. Display panels 20, 22, 24, 26 are fixedly mounted within the slots in their respective frame member and are held therein by set screws 50. Decals or other printed indicia may be affixed to the display panels.

Display panels which have no printed indicia thereon may be removed from the frame from their respective frame member by removing the pair of set screws 50 retaining the display panel within its respective slot. In the same manner, display panels that are damaged, or which include out-of-date printed indicia thereon, may be removed and quickly replaced by a new display panel.

I claim:

1. A frame for a license plate comprising:
   an upper member and spaced apart lower member,
   a pair of spaced apart side members interconnecting said upper and lower members,
   at least one of said members including structure defining an elongated slot therein;
   a display panel detachably received within said slot, said display panel having a display portion and a retaining portion, there being tabs on said retaining portion; and
   means for releasably retaining said retaining portion within said slot, said retaining means including set screws threadably received within said slot for engaging said tabs and thereby removably positioning said retaining portion within said slot.

2. A frame as claimed in claim 1, said tabs each including a leading edge, said leading edge oriented for abutting against said set screw when said panel is positioned within said slot.

* * * * *